United States Patent [19]
Eaton

[11] Patent Number: 5,883,928
[45] Date of Patent: Mar. 16, 1999

[54] METHOD AND APPARATUS FOR RECOVERING GROUP MESSAGES IN A TIME DIVERSITY RADIO COMMUNICATION SYSTEM

[75] Inventor: Eric Thomas Eaton, Lake Worth, Fla.

[73] Assignee: Motorola, Inc., Schaumburg, Ill.

[21] Appl. No.: 637,515

[22] Filed: Apr. 25, 1996

[51] Int. Cl.⁶ .............................. H04B 7/10; H04L 1/02
[52] U.S. Cl. .................. 375/347; 340/825.44; 370/470
[58] Field of Search .................... 375/259, 347; 370/465, 467, 470, 471, 474, 475, 476, 510, 509, 512; 340/825.44; 455/38.1, 458

[56] References Cited

U.S. PATENT DOCUMENTS

| | | | |
|---|---|---|---|
| 5,168,271 | 12/1992 | Hoff | 325/492 |
| 5,546,394 | 8/1996 | Eaton et al. | 340/825.44 |
| 5,657,357 | 8/1997 | Jones et al. | 375/347 |
| 5,740,532 | 4/1998 | Fernandez et al. | 455/404 |

*Primary Examiner*—Chi H. Pham
*Assistant Examiner*—Bryan Webster
*Attorney, Agent, or Firm*—Daniel K. Nichols

[57] ABSTRACT

In a time diversity system (100) including a radio receiving device (110), a temporary address, a group message associated with the temporary address, and an instruction vector for activating the temporary address are transmitted as original information and, subsequently, duplicate information in a radio signal having frames of data. When the original instruction vector is not received by the receiving device (110), a later frame is searched for the duplicate instruction vector, which, when located, activates the temporary address stored by the receiving device (110). The receiving device (110) then determines which frame capable of reception by the receiving device (110) includes the group message, and the receiving device (110) searches for the temporary address and the group message in that frame. The temporary address is then deactivated.

20 Claims, 8 Drawing Sheets

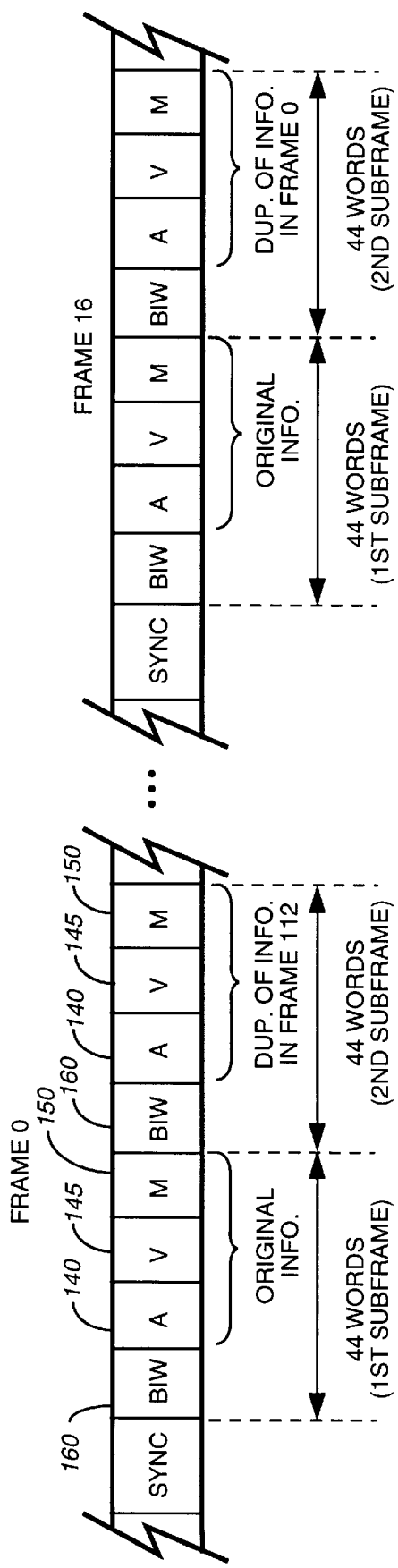
FIG. 2
FIG. 3
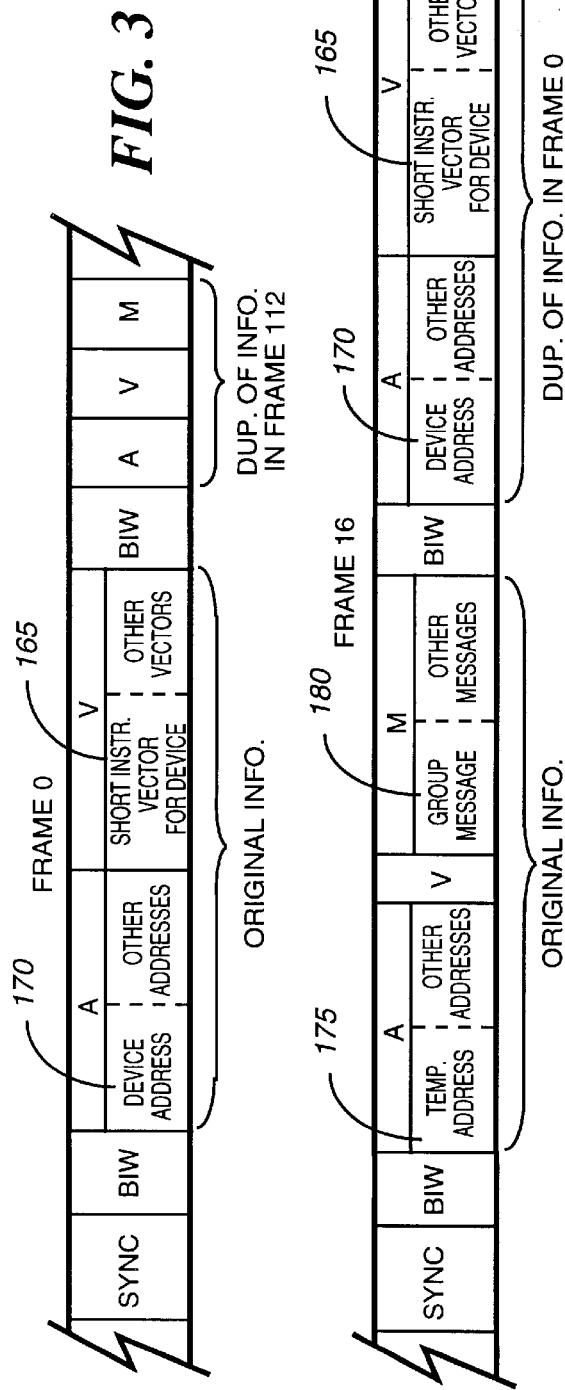
FIG. 4

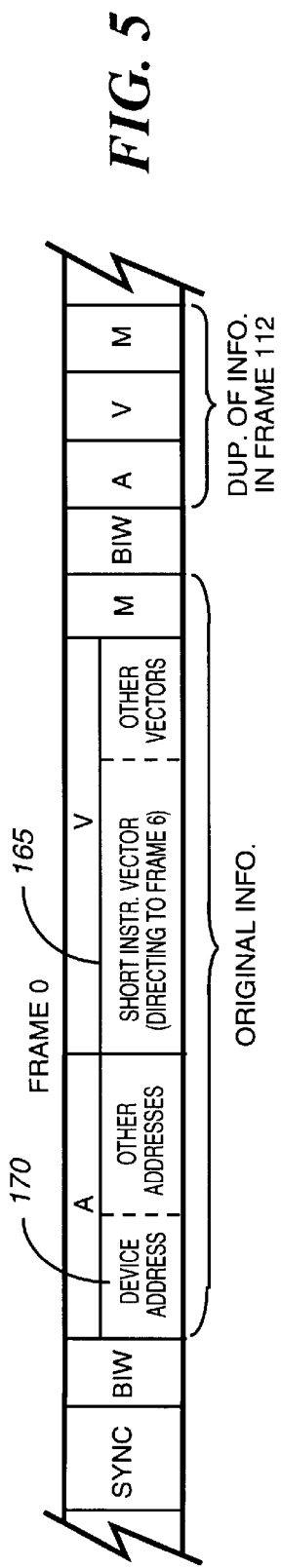
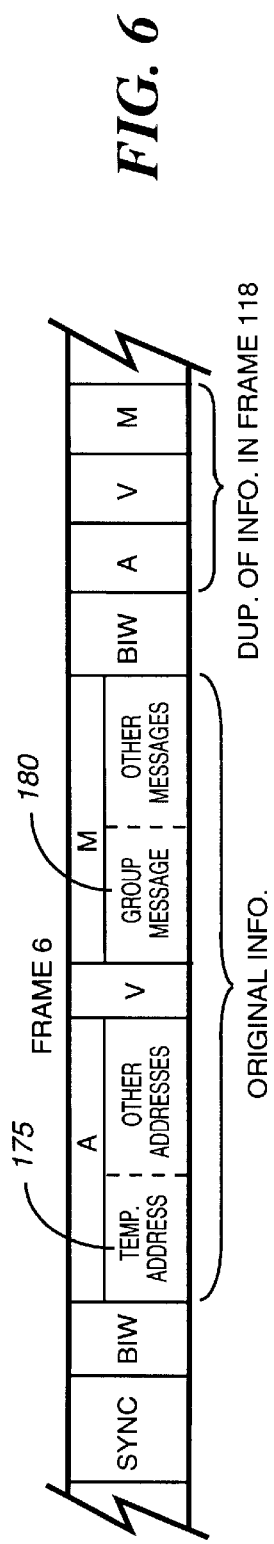
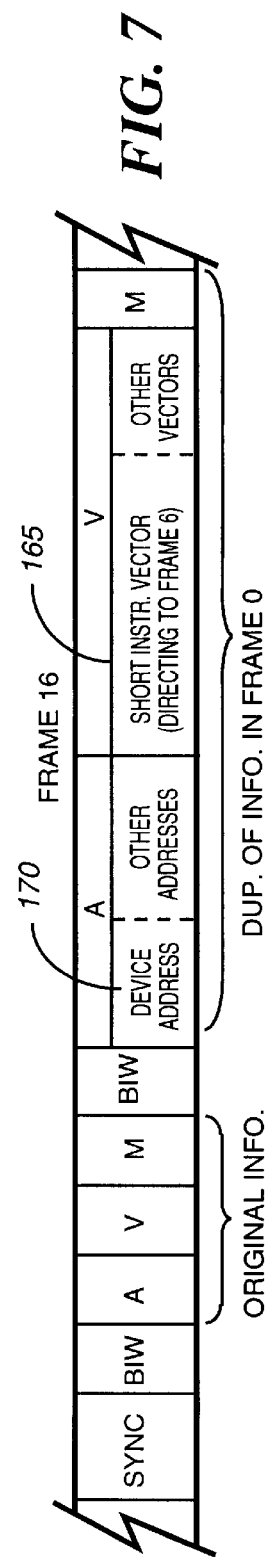
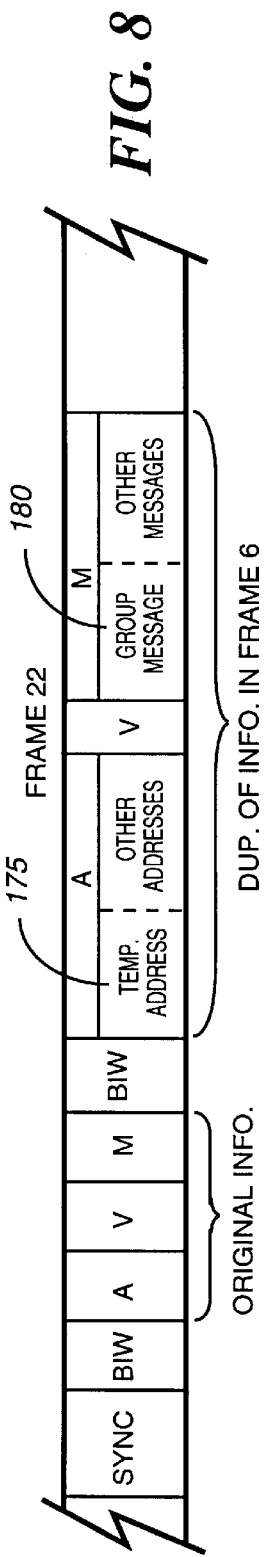

METHOD AND APPARATUS FOR RECOVERING GROUP MESSAGES IN A TIME DIVERSITY RADIO COMMUNICATION SYSTEM

FIELD OF THE INVENTION

This invention relates in general to message recovery in a radio communication system, and more specifically to the recovery of group messages in a time diversity radio communication system.

BACKGROUND OF THE INVENTION

Radio communication systems generally include a message transmission device, such as a base station or paging terminal, for encoding messages using a signalling protocol such as FLEX™. The encoded messages are then transmitted as a radio signal to portable devices, such as paging receivers. To increase the probability that a receiving device receives an error-free message, some systems employ "time diversity", e.g., the transmission of duplicate messages.

The receiving devices included in prior art systems are programmed with device addresses for normally receiving messages. Additionally, according to the FLEX™ protocol, the receiving devices also store a temporary address that is not used to search for messages until activated. When a group message is to be transmitted to selected devices, a short instruction vector is first transmitted to the selected devices, which are addressed through use of the corresponding device addresses. The short instruction vector activates the temporary address for the addressed devices and directs the devices to a location, e.g., a frame of data, in which the temporary address and a group message associated therewith can be found. The devices then receive the information transmitted in the frame specified by the short instruction vector and recover the group message. When the group message has been received, the devices deactivate the temporary address and once again use only their device addresses for message detection.

Like other messages, the short instruction vector, temporary address, and group message are duplicated one or more times in prior art time diversity systems. However, a device that misses or erroneously receives the initial transmission of the short instruction vector cannot receive the subsequently transmitted group message. Specifically, reception of the duplicate short instruction vector does not enable reception of the group message because the short instruction vector directs the device to a frame of data that was transmitted prior to transmission of the duplicate short instruction vector. So, by the time the duplicate short instruction vector is received, it is too late to receive the frame to which the device is directed by the vector. As a result, missing or erroneously receiving the short instruction vector causes the device to miss the group message.

Thus, what is needed is a method and apparatus for receiving the group message even when an initial transmission of the short instruction vector has been missed or erroneously received.

BRIEF DESCRIPTION OF THE DRAWINGS

FIGS. 2–8 are signal diagrams depicting the transmission of group messages within the communication system of FIG. 1 in accordance with the present invention.

DESCRIPTION OF THE PREFERRED EMBODIMENT

Figure 1:
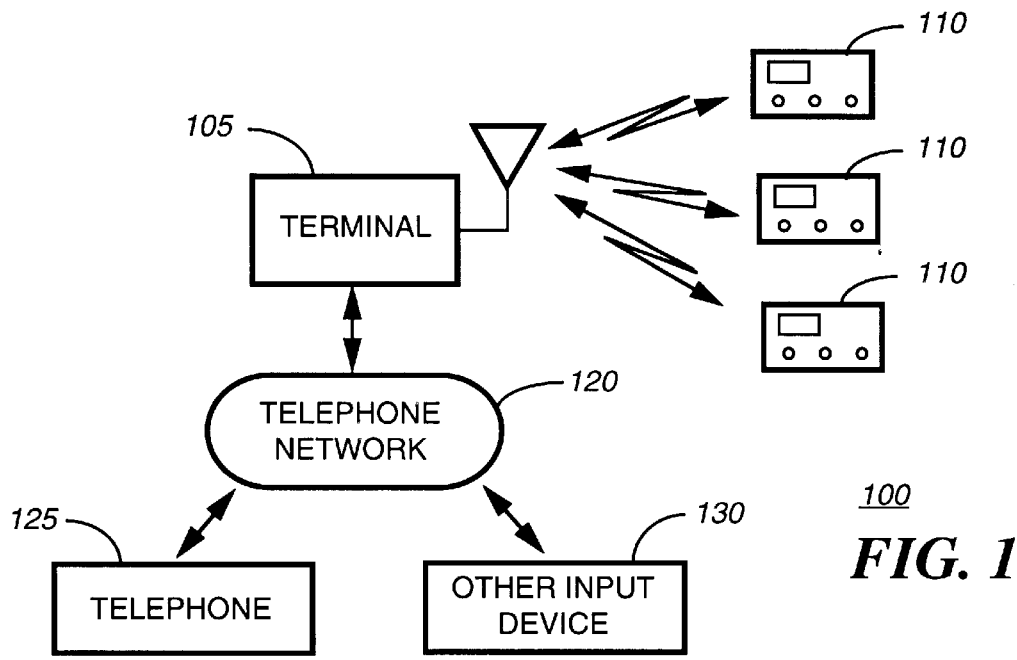
FIG. 1 is a communication system for providing and recovering group messages in accordance with the present invention.

FIG. 1 is a diagram of a time diversity radio communication system 100 including a message transmission device, such as a terminal 105, for transmitting messages to receiving devices 110, such as portable selective call receivers. The terminal 105 can be coupled to a telephone network 120 for receiving the messages thereover. Messages are generally provided to the telephone network 120 by conventional telephones 125 or other input devices 130. Information, such as device addresses, by which recipient receivers can be identified generally accompanies messages. The messages are transmitted to the receivers 110 more than a single time. For example purposes only, the following description describes a communication system 100 in which messages are transmitted two times. It will be appreciated, however, that duplicate messages may be transmitted more than a single time in other embodiments of the present invention.

Preferably, the terminal 105 transmits information over the air using a conventional signaling protocol such as FLEX™. Conventional FLEX™ protocol involves the division of a transmitted radio signal into cycles of one-hundred-twenty-eight (128) frames, each including a predetermined synchronization pattern (sync) and a plurality of words. When the radio signal is to be transmitted at 1600 bits per second, for example, eighty-eight words are included in each FLEX™ frame.

Referring next to the signal diagram of FIG. 2, for time diversity purposes, these eighty-eight words are usually divided into subframes, the number of which is determined by the number of duplicate messages provided in the system. When, for instance, a message is transmitted twice, as shown in FIG. 2, the frames are divided into two subframes, each including forty-four words. The first subframe is used to provide original information, while the second subframe is used to provide duplicate information that is the same as information originally transmitted one collapse cycle ago. When, for instance, a message is transmitted four times, the frames are divided into four subframes, each including twenty-two words. The first subframe includes original information, while the second subframe includes duplicate information replicating information originally transmitted one collapse cycle ago. The third and fourth subframes include duplicate information associated with information originally transmitted two and three collapse cycles ago, respectively.

Each subframe is usually divided into an address field (A) 140, which includes addresses of receivers 110 to which messages are being transmitted, a vector field (V) 145 following the address field, and a message field (M) 150.

Some addresses, such as those referring to numeric or alphanumeric messages, refer to a vector contained in the vector field, which specifies an area within the message field of the same subframe wherein a corresponding message is located. According to the FLEX™ protocol, each subframe also includes system information transmitted in a block information word (BIW) 160. The system information preferably includes the system collapse value and other information such as system identifiers used by roaming receivers.

In conventional FLEX™ systems, receivers are assigned a "base frame" in which messages can be received. A receiver generally receives its messages in the base frame or at recurring intervals thereafter. The recurring intervals are determined with reference to a pre-programmed receiver variable and/or a system variable transmitted in each subframe. These variables, commonly referred to as either a system collapse value or a receiver collapse value, define times during which the receiver 110 wakes from conventional battery saving to receive messages in "receive frames" given by the following formula:

$$\text{Receive Frame Nos.} = \text{Base Frame No.} + n2^{cv}, \quad (1)$$

where n=0, 1, 2, . . . , and where cv denotes the system collapse value, which varies according to the traffic in the system. A receiver 110 can normally utilize its pre-programmed collapse value, rather than the system collapse value, for receiving messages. When, the system collapse value falls below the receiver collapse value, though, the receiver 110 employs the system collapse value instead. For simplicity, receivers 110 included in the system 100 according to the present invention are described as using only the system collapse value. It will be appreciated, however, that the frames in which the messages are transmitted to a receiver 110 will vary when the receiver 110 switches between the collapse values of the receiver 110 and system 100.

As shown in FIG. 2, when the system collapse value equals four and the receiver 110 has a base frame of zero, the receiver 110 wakes in FRAME 0 and every sixteen frames thereafter. When, for instance, messages are transmitted twice in the system 100, the receiver 110 wakes in FRAME 0 and recovers any original information, i.e., initial transmissions, in the first subframe. The receiver 110 wakes again in FRAME 16 to recover original information.

As mentioned, when messages are transmitted twice in the communication system 100, the second subframe of each frame includes duplicate information replicating original information initially transmitted one collapse cycle ago. Therefore, when the receiver 110 has determined that original information first transmitted in a previous frame, such as FRAME 112, was not received correctly, duplicate information of that original information can be recovered from the second subframe of a subsequent frame, such as FRAME 0. Then, when original information of FRAME 0 has not been received correctly, duplicate information can be recovered in FRAME 16.

In FLEX™ systems, receivers 110 usually receive messages on device addresses associated with the receivers 110. However, the receivers 110 also store dormant temporary addresses that can be activated by reception of a short instruction vector provided to selected receivers 110. The temporary address is then used by the selected receivers 110 to recover a group message located in a frame specified in the short instruction vector. After a complete group message has been recovered by the receivers 110, the temporary address is deactivated in the receivers 110.

FIGS. 3 and 4 are signal diagrams illustrating the transmission of the short instruction vector, the temporary address, and the group message to receivers 110 in the system 100. When a receiver 110 to which a group message is to be provided is scheduled to wake in FRAME 0, for instance, a short instruction vector 165 (FIG. 3) is provided to the receiver 110 by addressing the receiver 110 using its programmed device address 170 (FIG. 3) on which it usually receives messages. The short instruction vector 165 and device address 170 are provided in the original information included in the first subframe of FRAME 0 since the vector 165 and address 170 are initially provided in FRAME 0. In response to reception of the short instruction vector, the receiver 110 activates its stored temporary address and searches for the temporary address 175 (FIG. 4) in the original information of the receive frame, i.e., FRAME 16, in the following collapse cycle. The receiver 110 then recovers the group message 180 (FIG. 4) associated with the temporary address 175.

Because the second subframe of FRAME 16 includes duplicate information of the original information included in the first subframe of FRAME 0, the device address 170 and short instruction vector 165 are duplicated in the second subframe of FRAME 16. Furthermore, although not shown, the temporary address 175 and group message 180 of FRAME 16 are duplicated in the second subframe of FRAME 32, i.e., the receive frame in the next collapse cycle. Therefore, when the group message is not received correctly in FRAME 16, the receiver 110 can attempt to retrieve the group message during FRAME 32 (not shown).

FIGS. 5–8 are signal diagrams depicting the transmission of the group messages in different locations of the radio signal. When the receiver 110 normally wakes in FRAME 0, the device address 170 (FIG. 5) and short instruction vector 165 (FIG. 5) are provided in the first subframe of FRAME 0. In this case, though, the short instruction vector 165 directs the receiver 110 to a frame outside its normal collapse cycle for reception of the group message. For instance, the receiver 110 could be directed to FRAME 6 (FIG. 6). In FRAME 6, the temporary address 175 is used by the receiver 110 to locate the group message 180, which is located in the original information of FRAME 6.

In this example, duplicate information is still provided to the receiver 110 in frames separated from the original frames, i.e., the frames in which the original information was transmitted, by one collapse cycle. Therefore, the device address 170 (FIG. 7) and short instruction vector 165 (FIG. 7) are duplicated in FRAME 16, while the temporary address 175 (FIG. 8) and group message 180 (FIG. 8) are duplicated in FRAME 22. Duplication of the group message provides the receiver 110 with another chance to receive the group message.

In prior art systems, a receiver cannot receive a group message when it has missed or erroneously received the initial transmission of the short instruction vector. As shown in FIGS. 4 and 7, a prior art receiver can receive the duplicate short instruction vector when it has missed the initial short instruction vector. However, by the time the duplicate vector is received, it is too late for the receiver to receive the group message to which the vector refers. For instance, when, in FIG. 4, the duplicate short instruction vector is received, the group message to which it refers has already been discarded by the prior art receiver. Similarly, the duplicate short instruction vector of FIG. 7 refers the receiver to FRAME 6, a frame which has previously transmitted and missed. As a result, the conventional receiver has already missed the initial transmission of the group message and has no means of determining the location of any duplicate group message, even when the duplicate group message has not yet been transmitted.

Conversely, the receiver 110 according to the present invention can miss or erroneously receive the initial transmission of the short instruction vector (FIGS. 3 and 5) and still receive the group message. When, in FIGS. 4 and 7, the receiver 110 receives the duplicate vector, it determines therefrom where the group message was initially transmitted. When, as shown in FIG. 4, the instruction vector makes no reference to another frame or refers to the same frame, the receiver 110 determines that the initial transmission of the group message is included in the original information of the same frame, i.e., FRAME 16.

The receiver 110 in accordance with the present invention does not discard the original information in a received frame until the duplicate information of that frame has been processed. Therefore, the receiver 110 can conveniently refer back to the original information and attempt to recover the initial group message. When the initial group message is determined to have been missed or to have been received erroneously, the receiver 110 waits for the receive frame, i.e., FRAME 32, of the next collapse cycle to recover the duplicate group message. As a result, the receiver 110 has two chances to recover the group message.

According to the present invention, when, as shown in FIG. 7, the instruction vector refers the receiver 110 to a frame outside its collapse cycle, the receiver 110 cannot recover the initial group message when the frame to which the receiver 110 is directed has already been transmitted. However, the receiver 110 preferably calculates, by reference to the collapse value, the number of the frame in which the duplicate group message is to be transmitted. When, for instance, the duplicate short instruction vector 165 (FIG. 7) refers to FRAME 6, the receiver 110 uses the system collapse value to determine that the duplicate group message will be transmitted in the receive frame that occurs one collapse cycle after FRAME 6. Therefore, the receiver 110 can advantageously recover the duplicate group message 180 (FIG. 8) in FRAME 22.

As a result, the receiver 110 according to the present invention can miss the initial short instruction vector and still recover a group message that has been transmitted to the receiver 110. The receiver 110 therefore recovers messages more reliably than prior art receivers that are unable to recover group messages once the initial short instruction vector has been missed.

Figure 9:
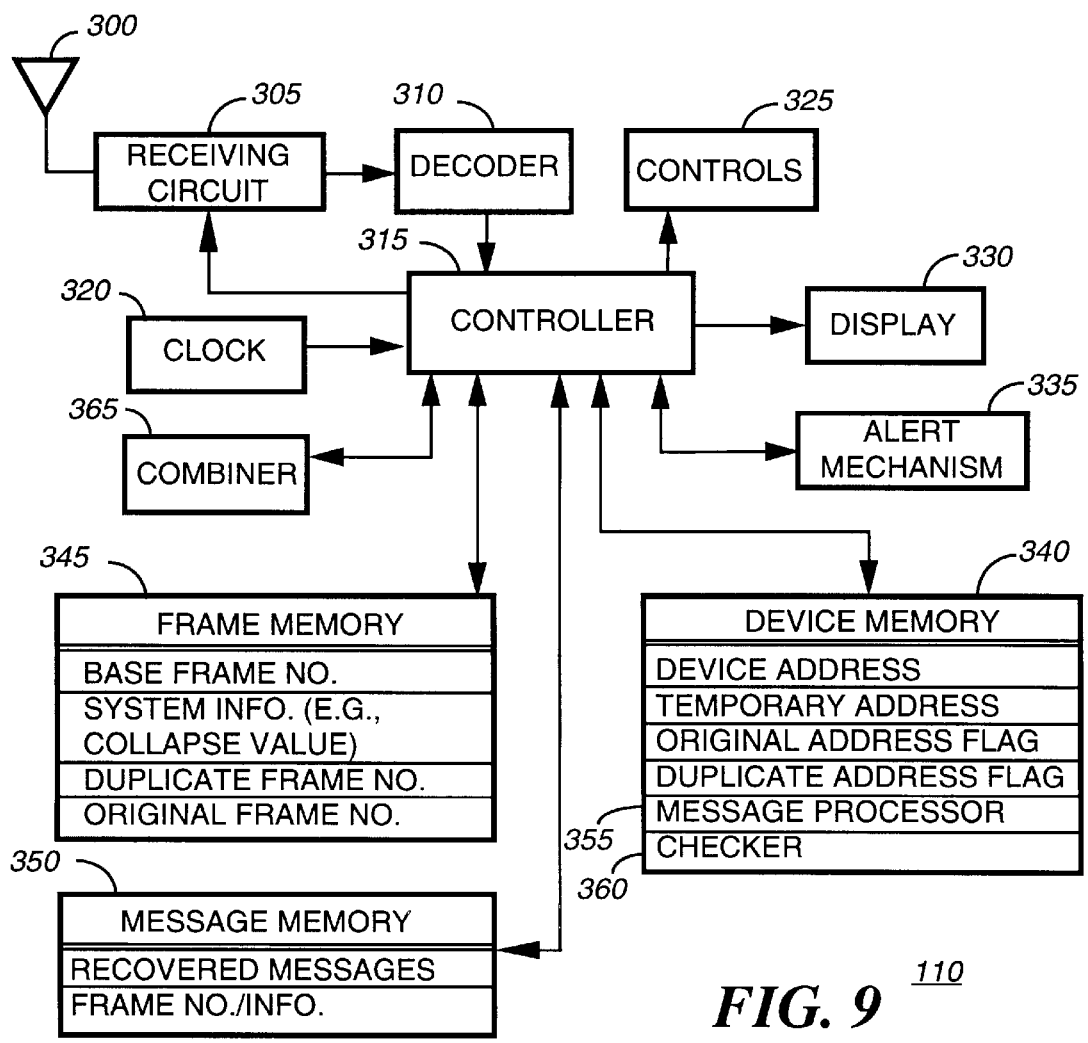
FIG. 9 is an electrical block diagram of a receiving device included in the communication system of FIG. 1 in accordance with the present invention.

Referring next to FIG. 9, an electrical block diagram of a receiver 110 in accordance with the present invention is shown. The receiver 110 comprises an antenna 300 for receiving a radio signal, a receiving circuit 305 for demodulating the received radio signal, and a decoder 310 for decoding the demodulated signal to generate data. A controller 315 coupled to the decoder 310 further processes the data to recover addresses and messages associated therewith.

The receiver 110 further includes a clock 320 for providing time values to the controller 315, controls 325 for receiving user-initiated signals, a display 330 for displaying messages to the user, and an alert mechanism 335 for alerting the user that a message has been received. A combiner 365 coupled to the controller 315 combines original information with duplicate information that replicates the original information to form messages that are less likely to include errors. The combiner 365 preferably employs conventional bit combining techniques and/or conventional word combining techniques.

A device memory 340 stores information used in operating the receiver 110. For instance, the device memory 340 can store the device address, on which messages are normally received, and the temporary address, which is used to receive group messages when it has been activated by reception of a short instruction vector. Also stored are an original address flag, indicating that the temporary address is activated and that the associated group message is located in original information of a received frame, and a duplicate address flag, indicating that the temporary address is activated and that the associated group message is located in duplicate information of a received frame.

The receiver 110 also includes a frame memory 345 for storing system information, e.g., collapse value, system identification information, etc., and a base frame number from which receive frames, i.e., frames in which the receiver 110 should wake, can be determined. Duplicate and original frame numbers are also stored to indicate frames in which the temporary address and associated group message are located. The duplicate frame number preferably refers to a frame in which the group message is duplicated, and the original frame number preferably refers to a frame in which the group message is initially transmitted. A message memory 350 is also coupled to the controller 315 for storing recovered messages and frame information of received frames.

According to the present invention, a message processor 355 included in the receiver 110 searches duplicate information to determine whether a short instruction vector has been transmitted to the receiver 110. When the message processor 355 determines that a short instruction vector is duplicated in the duplicate information, it computes the appropriate frame number in which the group message can be received by the receiver 110 and activates the temporary address by setting either the duplicate or original address flag.

A checker 360 included in the receiver 110 compares first system information included in the first block information word of a received frame to determine whether the first system information is equivalent to the stored system information. When the first system information and the stored system information are different, the checker 360 then examines the second system information, which is transmitted in the block information word of the second subframe. In this manner, the checker 360 can conveniently verify system information without going outside the collapse cycle of the receiver 110. Conversely, conventional receiving devices that detect non-matching system information in a received frame awake in the following frame to verify any changes in system information, which results in the discarding of stored duplicate information so that the off-cycle frame can be received and checked.

The message processor 355 and the checker 360 are preferably stored as firmware in the device memory 340. However, it will be appreciated that the message processor 355 and the checker 360 could alternatively be implemented in hardware capable of performing equivalent operations.

Figure 10:
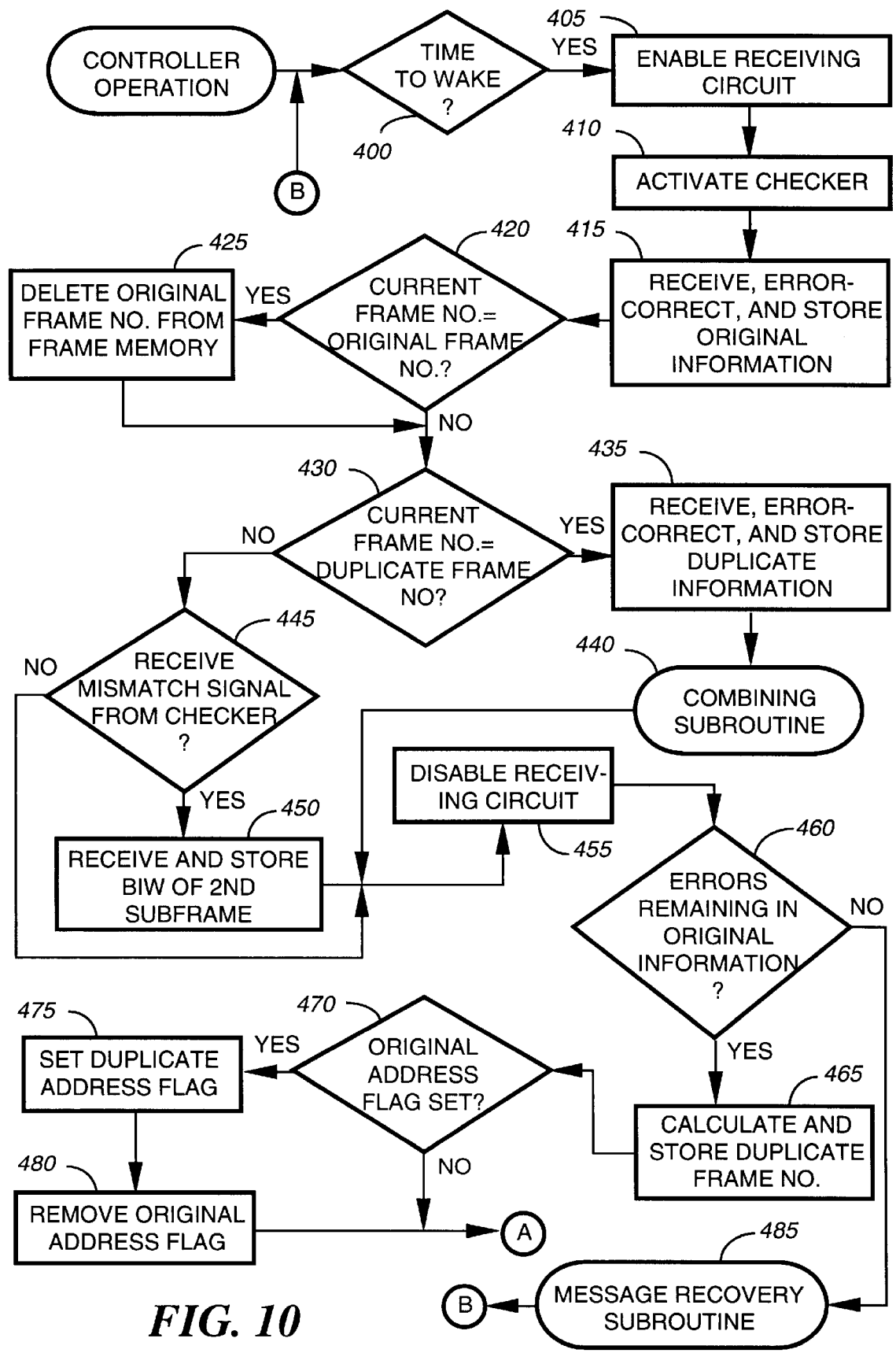
FIG. 10 is a flowchart of an operation of a controller included in the receiving device of FIG. 9 in accordance with the present invention.

FIG. 10 is a flowchart of an operation of the controller 315, which, at step 400, determines that it is time to wake and receive the current frame. The controller 315 preferably determines that it is time to wake when the current frame number is equivalent to a stored original frame number indicating that the current frame, which may be outside the collapse cycle, includes an initial group message. The controller 315 also determines that it is time to wake when the current frame is one in which the receiver 110 normally wakes for message reception.

In response to a determination that it is time to wake, the receiving circuit 305 is enabled, at step 405, and the checker 360 is activated, at step 410. The original information of the current frame is then, at step 415, received, error-corrected, and stored. When the controller 315 determines, at step 420, that the current frame number is equivalent to an original frame number, the original frame number is deleted from the frame memory 345, at step 425. When, at step 430, the current frame number is equivalent to a stored duplicate frame number, indicating that duplicate information of the current frame should be received, the duplicate information of the current frame is, at step 435, received, error-corrected, and stored. At step 440, processing continues with a combining subroutine that will be described in detail hereinafter.

When, at step 430, no duplicate information need be received and when, at step 445, the checker 360 (FIG. 9) has provided a mismatch signal indicating that the system information in the first subframe is different than the stored system information, the block information word of the second subframe is received and stored, at step 450. Once all necessary information in the current frame has been received and stored, the receiving circuit 305 is disabled for battery saving in a conventional manner, at step 455.

When, at step 460, no errors remain in the original information after error correction, processing continues, at step 485, with a message recovery subroutine, as will be described hereinafter. When errors are present in the original information even after it has been corrected by the controller 315, a duplicate frame number is calculated and stored, at step 465. The duplicate frame number refers to a subsequent frame in which duplicate information associated with the current erroneous information will be transmitted. When, at step 470, the original address flag is set, indicating that a group message is present in the current erroneous information, the duplicate address flag is set, at step 475, to indicate that the group message should be recovered in the subsequent receive frame. The original address flag can then be removed, at step 480.

Figure 11:
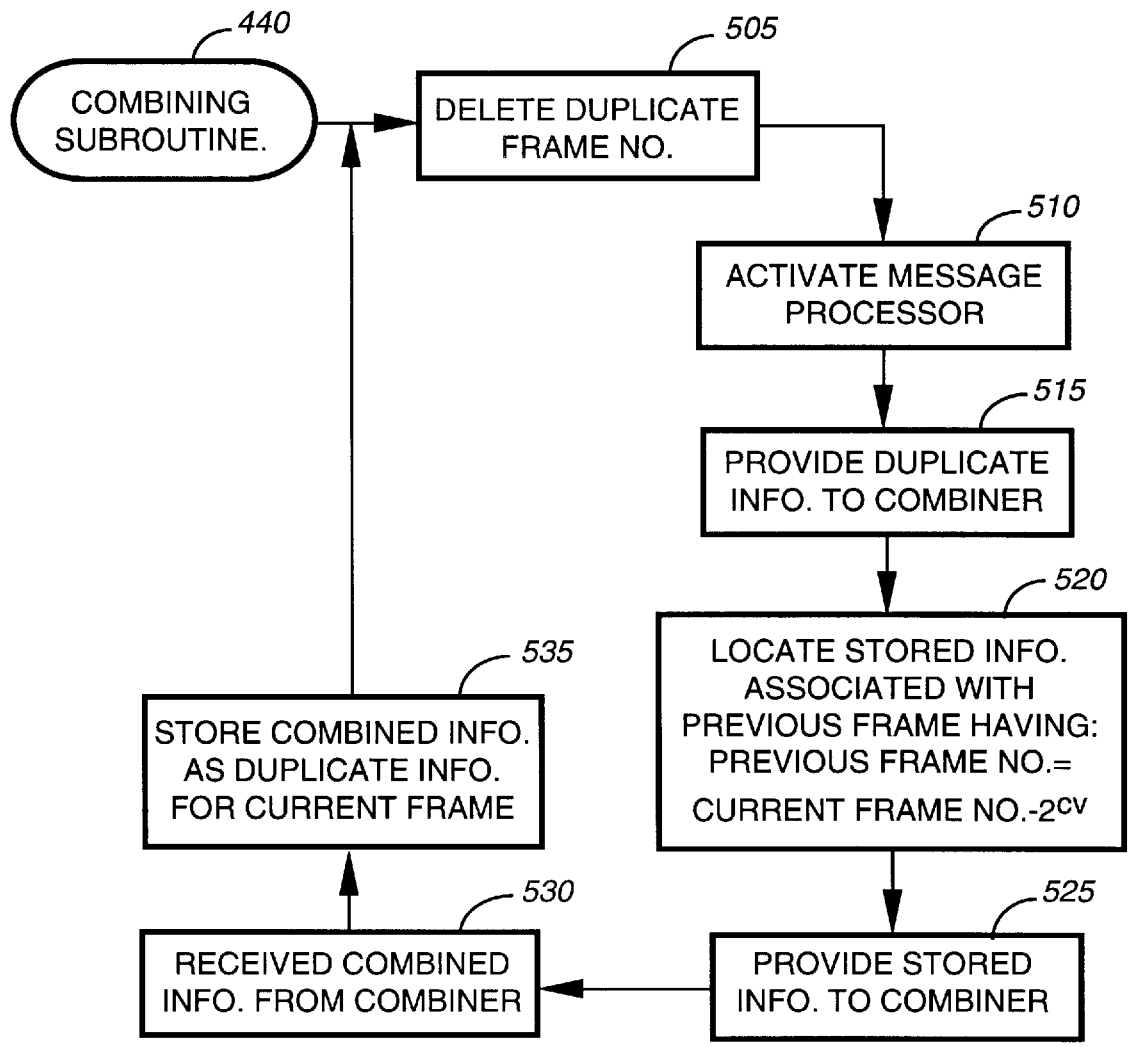
FIGS. 11 and 12 are flowcharts of subroutines performed by the controller included in the receiving device of FIG. 9 in accordance with the present invention.

FIG. 11 is a flowchart of the combining subroutine 440 performed by the controller 315. Once duplicate information has been received, error-corrected, and stored, at step 435 (FIG. 10), the stored duplicate frame number is deleted, at step 505, from the frame memory 345, and the message processor 355 (FIG. 9) is activated, at step 510. The duplicate information is then provided, at step 515, to the combiner 365. At step 520, previously received erroneous information is located by finding stored information associated with the frame received one collapse cycle ago. Specifically, the information can be located in the message memory 350 by looking up information associated with a previous frame number given by the following equation:

$$\text{Previous Frame No.} = \text{Current Frame No.} - 2^{cv} \qquad (2)$$

The located information is provided, at step 525, to the combiner 365, subsequent to which the combined information is received, at step 530, and stored, at step 535, as the duplicate information for the current frame.

Figure 12:
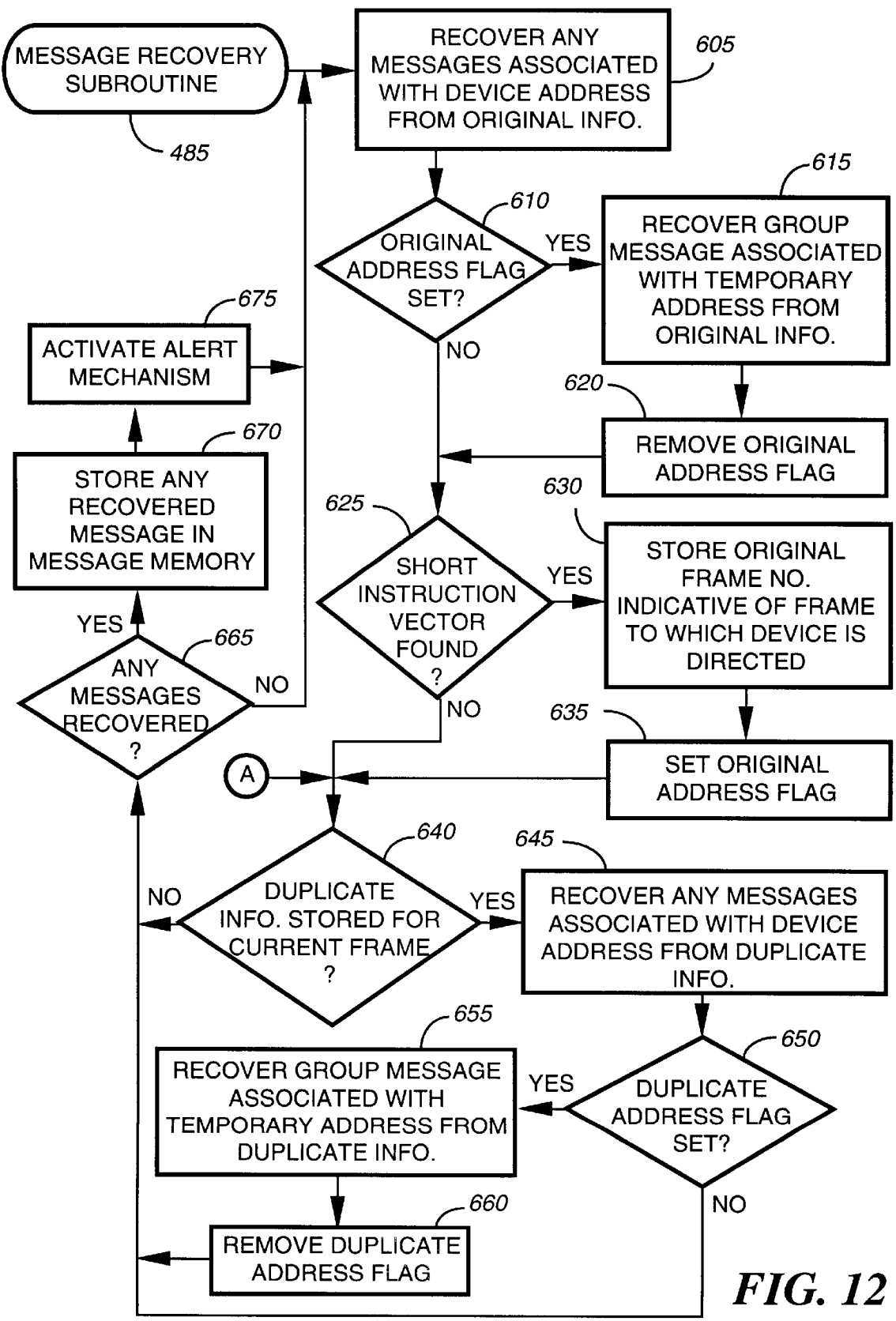

FIG. 12 is a flowchart of the message recovery subroutine 485 performed by the controller 315. After determining, at step 460 (FIG. 10) that no errors remain in the original information of the current frame, messages associated with the device address are recovered, at step 605, from the original information. When, at step 610, the original address flag is set, a group message associated with the temporary address is also recovered, at step 615. The original address flag is then removed, at step 620.

When, at step 625, a short instruction vector intended for reception by the receiver 110 is located, an original frame number indicative of the frame to which the receiver 110 is directed is stored, at step 630, and the original address flag is set, at step 635. As mentioned above, the receiver 110 could be directed outside its usual collapse cycle for retrieval of a group message, in which case storage of the original frame number is preferable to ensure that the receiver 110 wakes at the proper time. Alternatively, the group message could be transmitted in the original information of the next frame within the receiver's collapse cycle, in which case storage of the original frame number may be unnecessary.

When, at step 640, duplicate information has been received for the current frame, messages associated with the device address are recovered, at step 645, from the duplicate information. When, at step 650, the duplicate address flag is set, indicating that a group message is stored in the duplicate information, the controller 315 recovers, at step 655, the group message associated with the temporary address. The duplicate address flag is then, at step 660, removed. When, at step 665, any messages have been recovered from the frame information, the messages are stored, at step 670, in the message memory 350. The alert mechanism 335 is also activated, at step 675, to announce message reception to the user.

Figure 13:
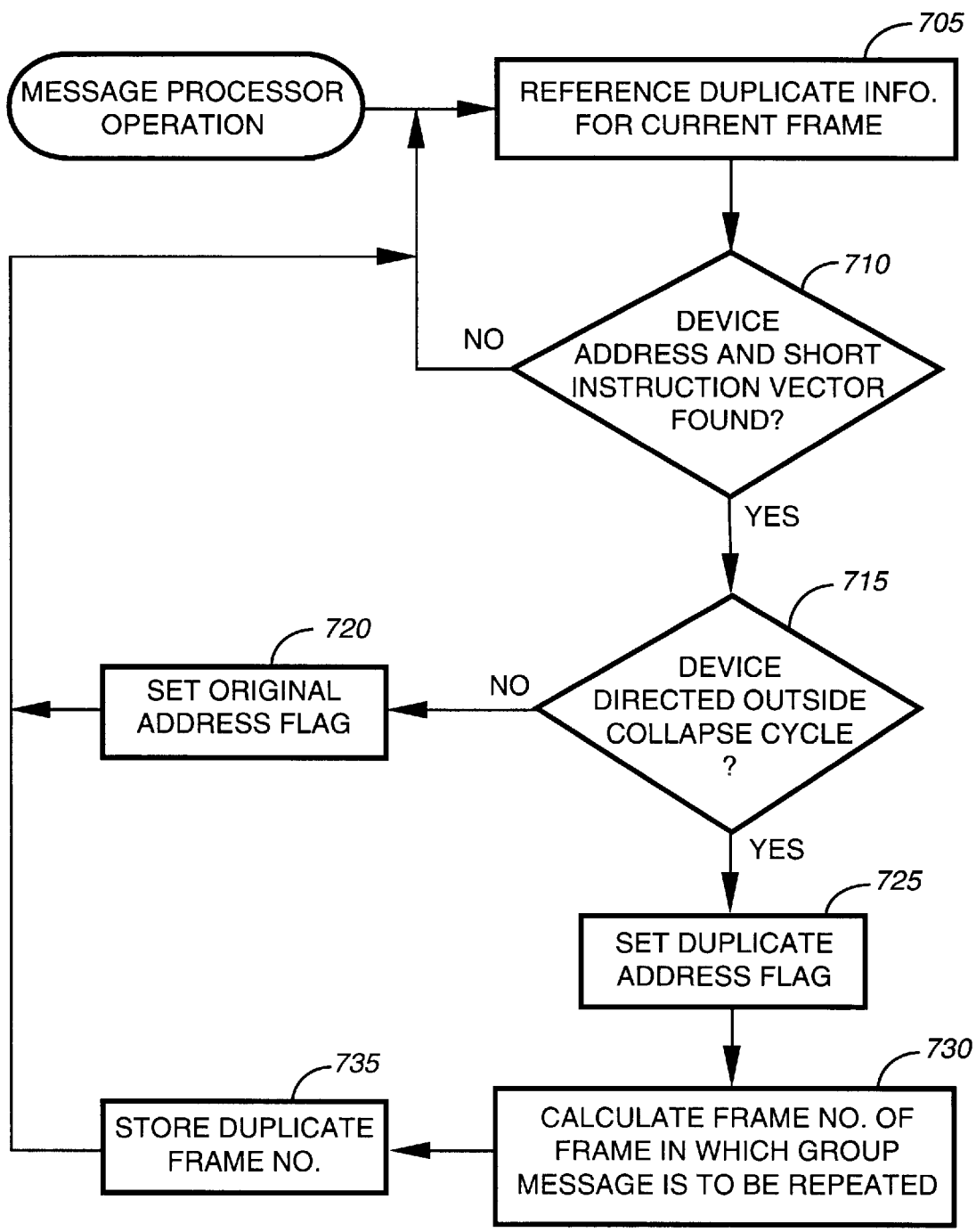
FIG. 13 is a flowchart depicting an operation of a message processor included in the receiving device of FIG. 9 in accordance with the present invention.

Referring next to FIG. 13, an operation of the message processor 355 (FIG. 9) is shown. After activation, the message processor 355 references the duplicate information for the current frame, at step 705. When, at steps 710, 715, a short instruction vector is located that directs the receiver 110 outside the collapse cycle, the message processor 355 determines that the original transmission of the group message has already been transmitted during a previous frame. Therefore, it is too late to receive the initial group message. However, according to the present invention, the message processor 355 computes information which can be referenced to recover the duplicate group message. In prior art receivers, this cannot be accomplished, so the group message is entirely missed.

At step 725, the message processor sets the duplicate address flag to indicate that subsequently received duplicate information contains a group message. Additionally, at step 730, the frame number of the frame in which the group message is to be duplicated is calculated. This can be done by using the following equation:

$$\text{Duplicate Frame No.} = \text{Current Frame No.} + 2^{cv} \qquad (3)$$

This equation computes the number of a subsequent frame one collapse cycle ahead of the current frame. At step 735, the duplicate frame number is stored in the frame memory 345 to indicate a future frame in which the group message is to be recovered from duplicate information.

Figure 14:
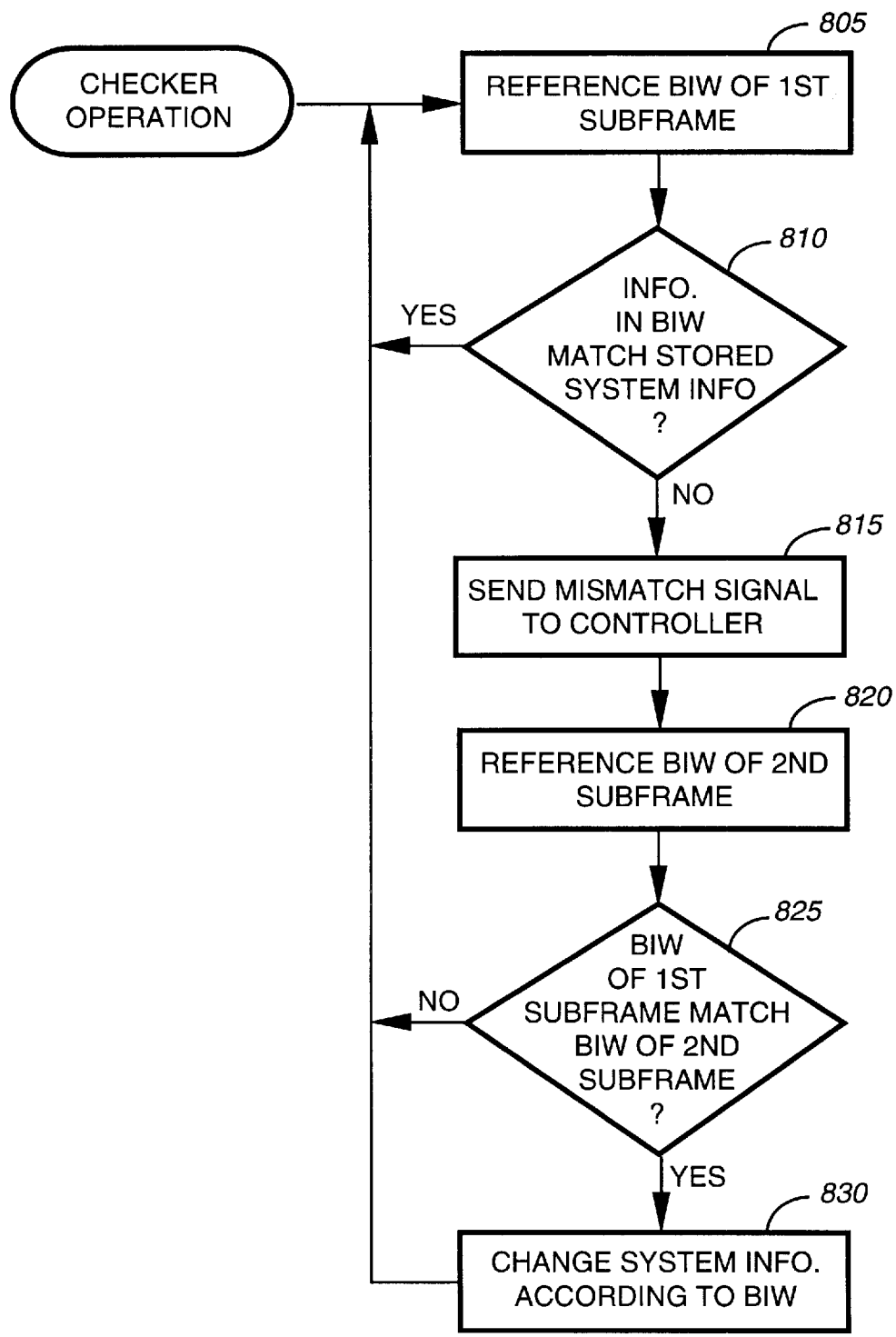
FIG. 14 is a flowchart of an operation of a checker included in the receiving device of FIG. 9 in accordance with the present invention.

Referring next to FIG. 14, a flowchart depicts an operation of the checker 360 (FIG. 9). At step 805, the first block information word of the current frame, i.e., the block information word included in the first subframe, is referenced. When, at step 810, the system information included in the first block information word is different than the stored system information, a mismatch signal is provided, at step 815, to the controller 315. In response to reception of the mismatch signal, the controller 315 enables reception of at least the second block information word in the same frame. Then, according to the present invention, the second block information word, i.e., the block information word included in the second subframe, is referenced, at step 820. When, at step 825, the first and second block information words within the current frame are equivalent, the stored system information is changed in accordance with the received block information words.

When, for instance, the transmitted collapse value within the first block information word is different than the collapse value stored in the frame memory 345, the checker 360 verifies the differences by referencing the second block information word within the same frame. When the differences are verified in this manner, the stored system information can be stored to reflect the changed collapse value.

Verification of the system information within a single frame has the advantage of preventing erroneous alteration of the stored system information based on an erroneously received first block information word. Additionally, because the system information can be verified within the same frame, the receiver 110 does not have to wake outside its normal collapse cycle. In prior art receivers, the system information can be verified only by waking outside the collapse cycle, resulting in loss of stored time diversity information that must be overwritten with the newly received block information word.

In summary, the time diversity communication system includes a receiver as described above for receiving an instruction vector that activates a temporary address associated with group messages. The instruction vector also directs the receiver to another frame in which a group message will be transmitted. The frame to which the receiver is directed can be either within its collapse cycle or outside the normal collapse cycle. When the initially transmitted instruction vector is missed or erroneously received, the receiver subsequently receives a duplicate transmission of the instruction vector. However, the initial group message with which the instruction vector is associated will have already been transmitted.

In response to reception of the duplicate short instruction vector, the receiver according to the present invention, unlike conventional receivers, determines receivers, determines the location of the initial group message. From this location, the receiver computes a subsequent location of the duplicate group message. When, for instance, the initial group message is included in the original information of the currently received frame, the receiver can receive both the initial and duplicate group message. On the other hand, when the initial group message was transmitted outside the collapse cycle of the receiver, the receiver awaits transmission of the duplicate group message. In this manner, the user of the receiver can advantageously receive a group message even when the initial instruction vector was missed.

It will be appreciated by now that there has been provided a method and apparatus for receiving a group message even when an initial transmission of an instruction vector has been missed or erroneously received.

What is claimed is:

1. A communication system for providing group messages in a radio signal comprising frames of data, the communication system comprising:

a message transmission device for transmitting, in a first frame, an instruction vector indicative of a second frame and, in the second frame, a temporary address and the group message associated with the temporary address, and for duplicating, in a third frame, the instruction vector indicative of the second frame; and a receiving device for receiving the instruction vector in the third frame after having not received the first frame correctly, for activating the temporary address in the second frame in response to receiving the instruction vector in the third frame, for determining a location of the group message within the radio signal and for recovering the group message associated with the temporary address.

2. The communication system of claim 1, the message transmission device further transmitting in a fourth frame the temporary address and the group message, wherein the receiving device comprises:

a message processor for detecting the instruction vector in the third frame, for activating the temporary address, and for determining which of the second frame and the fourth frame comprises the location in which the group message is to be received.

3. The communication system of claim 2, wherein the receiving device further comprises:

a receiving circuit coupled to the message processor for receiving the group message within original information included in the second frame; and a controller coupled to the receiving circuit for determining that the original information of the second frame has not been received correctly and, in response thereto, calculating a duplicate frame number indicative of the fourth frame in which the group message is duplicated, wherein the receiving circuit further receives the group message as duplicate information included in the fourth frame in response to activation by the controller.

4. The communication system of claim 2, wherein the receiving device further comprises:

a controller coupled to the message processor for calculating a duplicate frame number from the instruction vector, the duplicate frame number indicative of the fourth frame in which the group message is duplicated; and a receiving circuit coupled to the controller for receiving the group message as duplicate information included in the fourth frame.

5. The communication system of claim 2, wherein the receiving device further comprises:

a receiving circuit for receiving the group message in the location determined by the message processor; and a controller coupled to the receiving circuit for deactivating the temporary address in response to reception of the group message such that further group messages associated with the temporary address are not received without subsequent activation of the temporary address.

6. The communication system of claim 5, wherein the frames of data in the radio signal include at least first and second subframes comprising first and second system information, respectively, and wherein the receiving device further includes:

a checker coupled to the controller for comparing the first system information of a received frame to stored system information and, when the first system information and the stored system information are not equivalent, for comparing the first system information to the second system information within the received frame.

7. The communication system of claim 6, wherein the checker includes:

means for generating a mismatch signal in response to determining that the first system information and the stored system information are different and that the first system information and the second system information are equivalent, wherein the controller enables the receiving circuit to receive different frames in response to receiving the mismatch signal.

8. A receiving device for receiving group messages in a radio signal comprising frames of data including a first frame in which an instruction vector indicative of a second frame is transmitted, the second frame in which a temporary address and a group message associated with the temporary address are transmitted, a third frame in which the instruction vector indicative of the second frame is duplicated, and a fourth frame in which the temporary address and group message are duplicated, the receiving device comprising:

a receiving circuit for receiving, in the third frame, the instruction vector indicative of the second frame after having not received the first frame correctly; and a message processor coupled to the receiving circuit for activating the temporary address in response to receiving the instruction vector, for determining a location of the group message within the radio signal, and for recovering the group message from the location.

9. The receiving device of claim 8, wherein the group message is located in original information included in the second frame, and wherein the receiving device further comprises:

a controller coupled to the receiving circuit for determining that the original information of the second frame has not been received correctly and, in response thereto, calculating a duplicate frame number indicative of the fourth frame in which the group message is duplicated, wherein the receiving circuit further receives the group message as duplicate information included in the fourth frame in response to activation by the controller.

10. The receiving device of claim 8, further comprising:

a controller coupled to the message processor for calculating a duplicate frame number from the instruction vector, the duplicate frame number indicative of the fourth frame in which the group message is duplicated, wherein the group message is received as duplicate information included in the fourth frame.

11. The receiving device of claim 8, further comprising:

a controller coupled to the receiving circuit for deactivating the temporary address in response to reception of the group message such that further group messages associated with the temporary address are not received without subsequent activation of the temporary address.

12. The receiving device of claim 11, wherein the frames of data in the radio signal include at least first and second subframes comprising first and second system information, and wherein the receiving device further includes:

a checker coupled to the controller for comparing the first system information of a received frame to stored system information and, when the first system information and the stored system information are not equivalent, for comparing the first system information to the second system information within the received frame.

13. The receiving device of claim 12, wherein the checker includes:

means for generating a mismatch signal in response to determining that the first system information and the stored system information are different and that the first system information and the second system information are equivalent, wherein the controller enables the receiving circuit to receive different frames in response to receiving the mismatch signal.

14. The receiving device of claim 13, further comprising:

a device memory coupled to the controller for storing the message processor, the checker, the temporary address, and a device address associated with messages other than the group messages.

15. A method, in a receiving device, for recovering group messages provided in frames of data included in a radio signal comprising a first frame in which an instruction vector indicative of a second frame is transmitted, the second frame in which a temporary address and a group message associated with the temporary address are transmitted, a third frame in which the instruction vector indicative of the second frame is duplicated, and a fourth frame in which the temporary address and group message are duplicated, the method comprising the steps of:

determining that the first frame has not been received correctly;

receiving, in the third frame, the instruction vector indicative of the second frame in response to the determining step;

activating the temporary address in response to the receiving step;

determining from the instruction vector a location of the group message within the radio signal;

locating the temporary address in one of the second and fourth frames corresponding to the location; and recovering the group message associated therewith from the location.

16. The method of claim 15, wherein the determining step comprises the step of:

determining which of the second frame and the fourth frame comprises the location in which the group message is to be received.

17. The method of claim 16, wherein the recovering step comprises the steps of:

receiving the group message in original information of the second frame in response to determining that the location comprises the second frame;

determining that the original information of the second frame has not been received correctly;

calculating a duplicate frame number indicative of the fourth frame in which the group message is duplicated; and receiving the group message as duplicate information included in the fourth frame.

18. The method of claim 16, wherein the recovering step comprises the steps of:

calculating a duplicate frame number from the instruction vector, the duplicate frame number indicative of the fourth frame in which the group message is duplicated; and receiving the group message as duplicate information included in the fourth frame.

19. The method of claim 16, further comprising the step of:

deactivating, in response to the recovering step, the temporary address such that further group messages associated with the temporary address are not received without subsequent activation of the temporary address.

20. The method of claim 16, wherein the frames of data include at least first and second subframes comprising first and second system information, and wherein the method further includes the steps of:

determining, in response to the receiving step, that the first system information of the third frame is not equivalent to stored system information;

determining, subsequent to determining that the first system information is not equivalent to the stored system information, that the first system information is equivalent to the second system information of the third frame;

generating a mismatch signal in response thereto; and receiving different frames of data in response to the generating step.

* * * * *